United States Patent [19]
Mendez

[11] 3,952,894
[45] Apr. 27, 1976

[54] SPARE TIRE HOIST

[76] Inventor: John Mendez, 1223 Essex St., Imperial Beach, Calif. 92032

[22] Filed: Dec. 2, 1974

[21] Appl. No.: 528,696

[52] U.S. Cl. ............................... 214/451; 248/503
[51] Int. Cl.² ......................................... B62D 43/04
[58] Field of Search ..................... 224/42.23, 42.21; 214/451, 454

[56] References Cited
UNITED STATES PATENTS

| | | | |
|---|---|---|---|
| 2,775,358 | 12/1956 | Renouf | 224/42.23 X |
| 3,395,819 | 8/1968 | Fruetel | 224/42.23 X |

FOREIGN PATENTS OR APPLICATIONS

| | | | |
|---|---|---|---|
| 327,659 | 4/1930 | United Kingdom | 214/451 |

*Primary Examiner*—Robert J. Spar
*Assistant Examiner*—Jerold M. Forsberg

[57] ABSTRACT

A spare tire hoist intended to be mounted below the frame of a truck and to provide a lifting, lowering and storage mechanism for storing and removal of a spare tire, the hoist including a shaft journaled for rotation supported by the frame of the truck and having three flexible cables extending downwardly therefrom adapted to hook about the interior rim of the spare tire wheel when the wheel is placed in the horizontal position so that rotation of the shaft by a removable handle effects the winding of the cables about the shaft to raise the tire into engagement with the frame. A removable safety bolt is then inserted through the shaft to pass centrally through the tire rim when in the raised storage position and onto which there is affixed a safety plate for positive secure retainment of the spare wheel to the frame.

1 Claim, 3 Drawing Figures

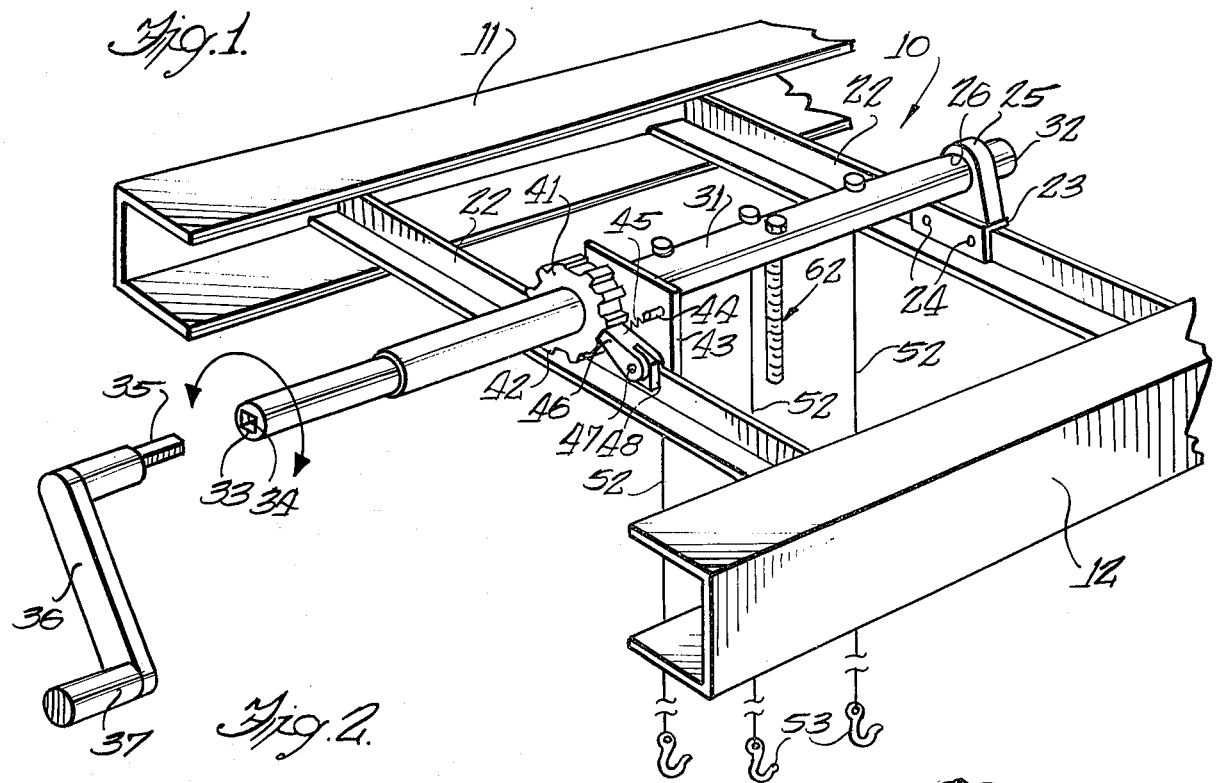
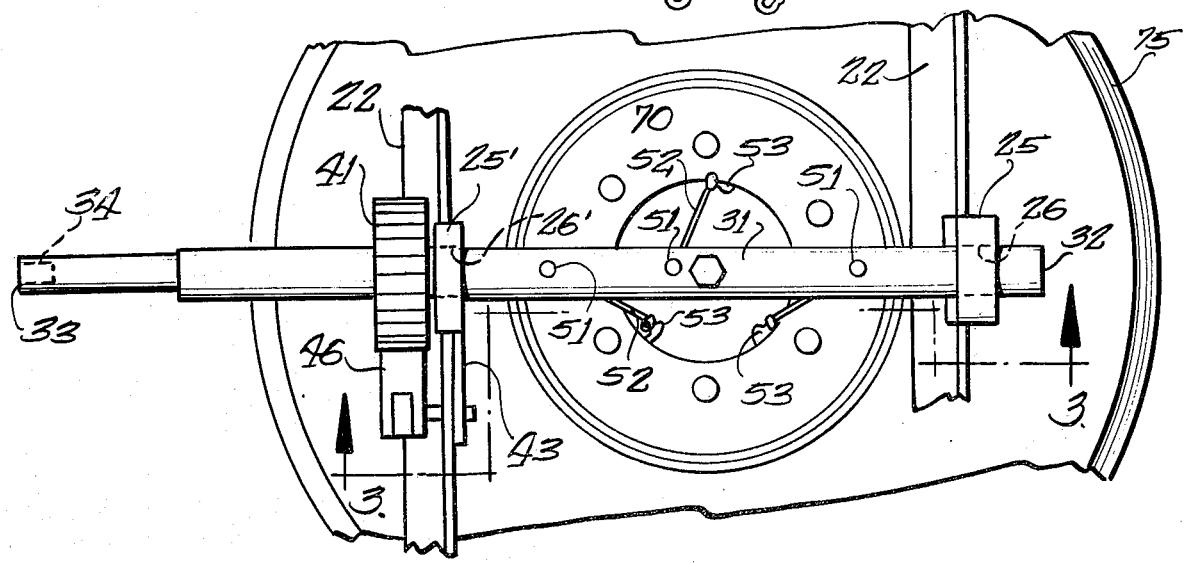
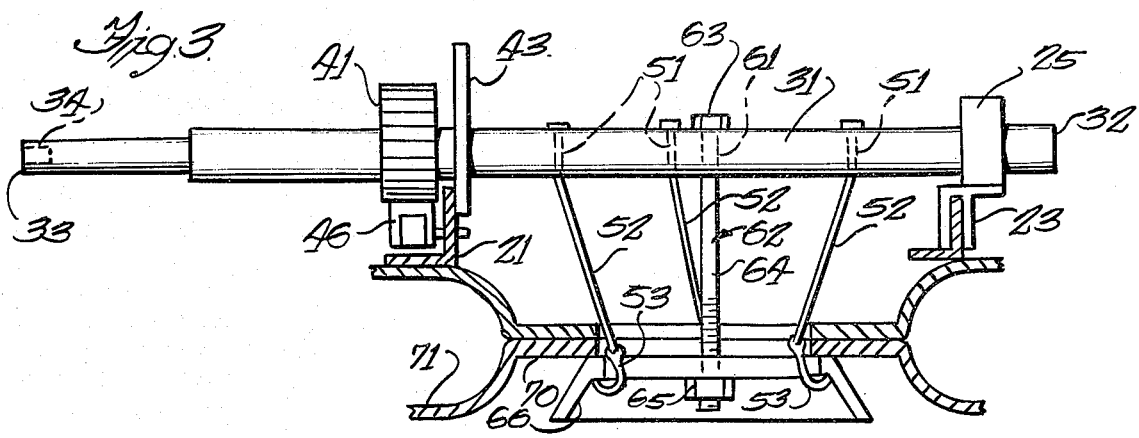

SPARE TIRE HOIST

BACKGROUND OF THE INVENTION

1. Field of the Invention

This invention relates generally to vehicle accessories and more particularly to a novel and improved spare tire hoist intended for use with motor truck vehicles and the like for the storing of a spare tire in a horizontal position below the frame of the vehicle.

2. Description of the Prior Art

In many vehicles the spare tire is conventionally mounted in a position occupying valuable space in the vehicle. Further, in those vehicles where the spare tire is not mounted in the vehicle, such as when mounted on the side of the vehicle frame for pickup trucks, vans and other vehicles, it is required that the spare tire be lifted manually to the storage position on the truck, this being a difficult and laborious project in view of the heavy weight of the tire and the height to which it must be lifted to be secured to the truck frame.

SUMMARY OF THE INVENTION

The present invention provides a novel spare tire hoist for the detachable mounting, demounting, and storage of a spare tire on a vehicle in a position below the vehicle frame where the tire is readily available for use in a rapid and efficient manner.

It is a feature of the present invention to provide a spare tire hoist.

A further feature of the present invention provides a spare tire hoist which is relatively simple in its construction and which therefore may be readily manufactured at a relatively low cost and by simple manufacturing methods so that it can be retailed at a sufficiently low price to encourage widespread use thereof among the general public.

Still a further feature of the present invention provides a spare tire hoist which is possessed of few parts and which therefore is unlikely to get out of order.

Yet still a further feature of the present invention provides a spare tire hoist which is easy to use and reliable and efficient in operation while yet being rugged and durable so that it may be guaranteed by the manufacturer to withstand many years of intended usage.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the spare tire hoist of the invention as mounted to vehicle frame members;

FIG. 2 is a top plan view of the hoist of the invention; and

FIG. 3 is a cross-sectional view taken along line 3-3 of FIG. 2.

DESCRIPTION OF THE PREFERRED EMBODIMENT

Referring now to the drawings in detail there is illustrated a preferred form of a spare tire hoist constructed in accordance with the principles of the present invention and which is designated generally in its entirety by the reference numeral 10 and which, for purposes of illustration, is shown as mounted between parallel frame members 11 and 12 of a conventional truck frame.

The hoist 10 includes a pair of supporting channel members 21 and 22 each of an L-shaped cross-sectional configuration when viewed in cross-section and each of a length to extend completely between frame members 11 and 12 and to have their end portions permanently affixed thereto in any suitable manner, such as by welding, bolts and the like.

Affixed centrally of channel member 22 is an inverted U-shaped bracket 23 having its leg portions affixed to the upright portion of support 22 by bolts 24 and supporting on its bight portion the housing 25 of a ball bearing assembly 26. A similar housing 25' is similarly affixed to the upright of support 21 in axial alignment with housing 25 and supports ball bearings 26' therein.

An elongated tubular rod or shaft 31 extends axially through ball bearings 26, 26' and has a back end 32 and a front end 33, the front end being provided with a rectangular cross-sectional socket 34 adapted to receive therein the drive bar 35 of ecentric handle 36 having handle member 37. Handle 36 when received in socket 34 effects the rotation of shaft 31 in either direction about its longitudinal axis.

Disposed concentric on shaft 31 outwardly of housing 25' is a toothed sprocket type wheel 41 having teeth 42. Similarly disposed on upright portion of support 21 adjacent to housing 25' is a vertically disposed plate 43 having a cylindrical boss member 44 projecting outwardly therefrom spaced from gear 41 and affixed by a spring 45 to a forward end of a cog 46 pivotally connected by pivot pin 47 to bracket 48 affixed to the upright portion of support 21 a distance spaced from gear 41.

Cog 46 is engaged by teeth 42 in a manner to permit free unhindered rotation of shaft 31 in a first direction about its axis, with the cog preventing reverse rotative movement of the shaft until the cog is manually removed from engagement with the teeth 42, and only then is reverse rotative movement obtainable.

Disposed in shaft 31 at spaced intervals between housings 25, 25' are three bores 51 each extending diametrically through the shaft and each adapted to receive therethrough a one-quarter inch diameter cable 52 each having its top end knotted, welded, or otherwise secured to the shaft 31 with each of the bottom ends terminating in a hook member 53.

Disposed centrally between support 21 and 22 in shaft 31 is a diametrically extending opening 61 which extends parallel to bores 51 and is adapted to removably receive therethrough a safety bolt 62 having an enlarged head 63 engaging one end of shaft 31, and a threaded shank 64 extending downwardly through opening 61 and terminating in a threaded portion adapted to threadedly receive thereon a nut 65 for retaining a safety plate 66 positively secured thereto for holding the wheel rim 70 of tire rim 71 in contact with the horizontal portions of supports 21 and 22.

In operation, a tire 75 is positioned horizontally below the spare tire hoist 10 resting on the ground. Hooks 53 are then lowered on cables 52 in a manner to engage the interior rim of the spare tire wheel or of the safety plate 66 positioned below the tire. Shaft 31 is then rotated about its axis by means of handle 36 until tire 75 engages the horizontal portions of supports 21 and 22. Safety bolt 62 is then inserted through opening 61 to pass through safety plate 66, after which nut 65 is threaded thereonto to retain in a positive manner the safety plate securing the tire positively to the hoist.

To lower the tire, the individual first makes sure that the hooks 53 are in engagement with the tire rim or safety plate 66, after which nut 65 is removed from safety bolt 62 with the safety bolt being removed from shaft 31. Handle 36 is then inserted into socket 34. While holding the handle, the cog 46 is removed from contact with gear teeth 42 after which the handle may be rotated in a direction to lower the tire 75 from the device, or alternatively, the tire may be allowed to fall by gravity and unwind the cables 52 from shaft 31 as so falling. Hooks 53 are then removed from the tire which is then ready for use.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, What is claimed is:

1. A spare tire hoist intended for use with a tire of a vehicle and adapted to be mounted intermediate a pair of opposed horizontal frame members of the vehicle, said hoist comprising, in combination:

a pair of parallel spaced apart support members each of an identical configuration and each having its end portions adapted to be affixed between said vehicle frame members to extend transversely therebetween;

a pair of ball bearing members mounted in associated housings, each housing associated with one of said support members affixed centrally thereof and extending upwardly therefrom;

an elongated cylindrically shaped shaft extending axially through said ball bearings and rotatably supported thereby for rotation in opposite directions about its axis, said shaft having a rectangular socket disposed in one end thereof and extending axially thereinto;

means for effecting rotation of said shaft in either direction about its axis including a drive bar member of rectangular cross-sectional configuration adapted to be removably inserted into said socket and to project outwardly therefrom, a lever arm having one end affixed to said drive bar with the opposite end extending outwardly radially therefrom and a hand grip handle member affixed to the free end of said lever arm and projecting outwardly normal thereto in a direction opposite of said drive bar for gripping by an individual hand to effect rotation of said lever arm about the axis of said drive bar to effect rotation of said shaft;

means for permitting unhindered rotation of said shaft in a first direction about its axis and for preventing rotation of said shaft in an opposite direction about its axis including a toothed sprocket type gear wheel affixed concentrically to said shaft positioned outwardly of said ball bearing housing adjacent one of said support members, a cog member pivotally secured at one end to said support member for pivotal rotation relative thereto in the vertical plane of said gear wheel between a position engaging said teeth of said gear wheel and a position free of said teeth of said gear wheel, a plate member affixed to said support member and extending upwardly therefrom, a boss member having one end affixed to said plate member with the opposite end thereof projecting into said plane of said cog member and a spring having one end connected to said boss member with its opposite end connected to said cog for resiliently biasing said cog into engagement with the teeth of the gear wheel;

three diametrically extending bores spaced longitudinally apart and disposed in said shaft between said support members;

three independent lengths of flexible cables each having one end extending through an associated one of said shaft bores and affixed thereto with the opposite end extending downwardly therefrom;

three hook members, each associated with the free end of one of said cables and affixed thereto;

means positively securing said tire to said support members after being hoisted thereto by operation of said shaft;

said tire hoist being further characterized by a cylindrical bore extending diametrically through said shaft parallel to said three cable bores and centrally of said shaft intermediate said support members;

a safety bolt having an enlarged head member and an elongated threaded shank member, said shank member being of a diameter to be removably inserted through said shaft aperture to project downwardly therefrom;

a safety plate of a diameter to engage the bottom surface surrounding the interior periphery of the rim of said tire;

an aperture extending centrally through said safety plate of a diameter to receive said safety bolt shank therethrough; and a nut threadably received on said safety bolt when said tire is in an elevated position supported by said hook members and engaging said support members, said nut retaining said safety plate positively secure to said safety bolt for positive retention of said tire with respect to said hoist.

* * * * *